US009460126B1

United States Patent
Engers (10) Patent No.: US 9,460,126 B1
(45) Date of Patent: Oct. 4, 2016

(54) ROTATIONAL MAINTENANCE OF DATABASE PARTITIONS

(71) Applicant: Amazon Technologies, Inc., Reno, NV (US)

(72) Inventor: Ross Bevan Engers, Cape Town (ZA)

(73) Assignee: Amazon Technologies, Inc., Seattle, WA (US)

(*) Notice: Subject to any disclaimer, the term of this patent is extended or adjusted under 35 U.S.C. 154(b) by 268 days.

(21) Appl. No.: 14/337,009

(22) Filed: Jul. 21, 2014

(51) Int. Cl.
*G06F 17/30* (2006.01)

(52) U.S. Cl.
CPC ... *G06F 17/30289* (2013.01); *G06F 17/30575* (2013.01)

(58) Field of Classification Search
CPC .................. G06F 17/30339; Y10S 707/99943
See application file for complete search history.

(56) References Cited

U.S. PATENT DOCUMENTS

| | | | | |
|---|---|---|---|---|
| 6,401,098 B1* | 6/2002 | Moulin | ............... | G06F 17/30 705/34 |
| 6,615,223 B1* | 9/2003 | Shih | ............... | G06F 17/30575 707/625 |
| 6,691,146 B1* | 2/2004 | Armstrong | ............ | G06F 9/45537 709/224 |
| 7,124,141 B2* | 10/2006 | Norcott | ............ | G06F 17/30306 707/769 |
| 7,788,233 B1* | 8/2010 | Iyer | ............... | G06F 17/30339 707/661 |
| 8,880,565 B2* | 11/2014 | Fricke | ............... | G06F 17/30584 707/737 |
| 8,886,796 B2* | 11/2014 | Calder | ............... | H04L 67/1002 709/224 |
| 8,930,312 B1* | 1/2015 | Rath | ............... | G06F 17/30575 707/634 |
| 2014/0258300 A1* | 9/2014 | Baeumges | ............ | G06F 17/30339 707/737 |
| 2015/0127625 A1* | 5/2015 | Bulkowski | ............ | G06F 17/30575 707/703 |

* cited by examiner

*Primary Examiner* — Cheryl Lewis
(74) *Attorney, Agent, or Firm* — Baker & Hostetler LLP (57) ABSTRACT

A distributed database management system may comprise a group of partitions that includes a master writeable partition and one or more additional partitions that act as read-only replicas of the master. A rotational mechanism for performing maintenance operations on non-master partitions may be employed to transition a second partition, selected for undergoing maintenance, into a role as the new master following performance of the maintenance operation.

21 Claims, 8 Drawing Sheets

ROTATIONAL MAINTENANCE OF DATABASE PARTITIONS

BACKGROUND

A distributed database system may comprise a number of partitions, each of which may handle some proportion of workload processed by the distributed database system. Certain partitions in the system may be designated as writable and serve as master partitions for others. These other partitions may replicate data stored in their master and help with load balancing requests to retrieve data stored in the system.

Maintenance operations may be performed on a partition in a distributed database management system. However, performance maintenance on a partition may have an adverse impact on its performance. For example, a maintenance operation may involve actions such as removing unwanted data, defragmenting storage space, and so on that may involve significant consumption of computing resources. Accordingly, performing a maintenance operation on a partition may result in various effects such as falling behind in replication or slowing the processing of requests to store or retrieve data.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may be employed to operate a group of partitions in a distributed database system, where the group consists of a master partition which processes requests to store data in the distributed database system, and additional partitions that act as replicas of the master partition and process requests to retrieve data stored in the distributed database system. A rotational mechanism may be employed in which a replica partition is selected for undergoing a maintenance procedure and then transitioned into a role as the new master of the group.

Operation of a group of partitions may involve performing various maintenance operations or procedures on a partition in the group of partitions. One example of such an operation involves pruning data. A partition may accumulate data over time and older data in a partition may no longer be needed in that partition. For instance, older data might be moved from a partition into an archive, or deleted from the partition altogether. Other examples of maintenance operations include re-indexing, defragmentation, rebalancing data between partitions, calculating statistics, executing data definition language statements, generating reports, and so forth. Various manual maintenance procedures may also be performed, and may involve the operation of the partition and any associated hardware components, such as storage devices.

Embodiments may rotate a recently maintained partition into the master role. This may be done, for example, to allow a partition that has most recently undergone maintenance to act in the master role, which may be useful for various reasons such as minimizing the chance of a malfunction of the partition acting as master. The partition that has most recently undergone maintenance may also, in some cases, be the best performing partition among partitions in its group.

Embodiments may perform rotational maintenance by a system or method that transitions a non-master partition to a maintenance mode and then transitions the partition into the role of master. The partition initially designated as master may be transitioned from its role as the old master to a role as a replica of the new master.

The present disclosure utilizes the phrases "first partition" and "second partition" to refer to members of a group of partitions. For illustrative purposes, the phrase "first partition" is generally used to refer to a partition initially designated as master, or designated as master just prior to the performance of various operations described herein. The phrase "second partition" is generally used to refer to a partition that is acting as a replica of the first partition, and which will be rotated into maintenance mode and then into the role of the new master. The phrases "additional partitions" and "third partition" may also be used in the present disclosure, referring to other partitions in the group configured initially as replicas of the first partition.

A system may comprise computing nodes coupled to corresponding storage devices. The computing nodes may each maintain a partition. The system may be configured so that requests to store data are processed by the first partition and the stored data may then be propagated via replication to other partitions in the group. A second partition, for example, may receive and store the replicated data. The second partition may process requests to read data as part of a set of partitions identified as candidates for load balancing requests to access data.

It may be determined that a maintenance operation should be performed on the second partition, and in response to the determination the second partition may be removed from the set of partitions identified as a candidate for assisting in load balancing by being able to accept requests to access data. Replication from the first partition to the second partition may also be suspended in response to the determination. The maintenance operation may then be performed on the second partition.

Embodiments may then determine to transition the second partition into a role as the new master of its group. Embodiments may process pending replication messages from the first partition and then begin redirecting write requests to a buffer for later processing by the second partition. Replication relationships may be established from the second partition to other partitions in the group, including the first partition. The second partition may then process the buffered requests to store data, and the stored data may be propagated to the other partitions.

Figure 1:
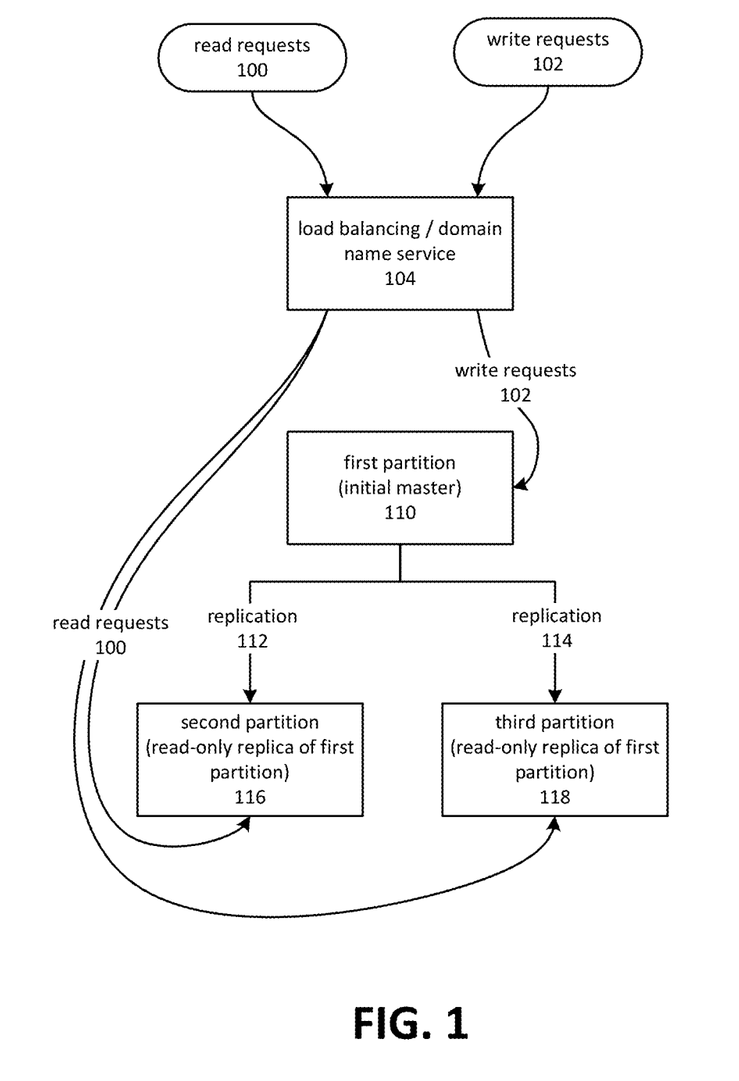
FIG. 1 is a block diagram depicting an embodiment of a distributed database system configured for performing maintenance operations using rotation of partitions.

FIG. 1 is a block diagram depicting an embodiment of a distributed database system configured for performing maintenance operations using rotation of partitions. A distributed database system may comprise a plurality of partitions, such as a first partition 110, a second partition 116, and a third partition 118. A partition may refer to a computing node configured as a maintainer of a portion of data maintained by the distributed database management system. In some cases and embodiments, for example, a partition may comprise a computing node configured as a maintainer of a portion of a horizontally or vertically partitioned table. However, as used herein, the term partition is not limited to a computing node configured as a maintainer of horizontal and vertical partitions. The term partition may also refer to a maintainer of any complete or incomplete set of data maintained by a distributed database management system. This could, for example, include maintenance of data corresponding to a set of tables, a single table, or to a portion of a table. As used herein, the term table may refer to various structures for the representation and/or storage of a collection of data.

A partition, such as first partition 110, may be initially designated as a master partition. The system may operate the first partition 110 as the master partition by processing requests to write data on the first partition 110 and then replicating the data from first partition 110 to other partitions, such as second partition 116 and third partition 118. Replication may comprise propagating updates from first partition 110 to second partition 116, and from first partition 110 to third partition 118, in order to cause the second and third partitions to become, over time, replicas of first partition 110. There may be discrepancies in the rates at which first partition 110 may receive and process updates and the rate at which second partition 116 or third partition 118 may process updates. However, over time each of the partitions may be considered replicas of each other.

FIG. 1 depicts first partition 110 as being configured as a master partition. Write requests 102 may correspond to requests to update data maintained by the distributed database management system depicted in FIG. 1. As used herein, the terms "update," "updating data," "writing data," "storing data," and the like may be considered to be equivalent. A request to perform a write operation may originate, for example, with a client of the distributed database management system and may comprise insert, update, and delete operations.

A load balancing/domain name service 104 may participate in processing write requests 102 by directing write requests 102 to first partition 110, based at least in part on first partition 110 having been selected as master. The write requests may be processed by or on first partition 110, so that data is updated on storage devices associated with first partition 110. The updated data may then be replicated, via replication 112 and replication 114, to second partition 116 and third partition 118. Replication 112 and replication 114 may comprise various mechanisms for transferring updated data from a source to a destination. This could be accomplished, for example, by transporting log information from a source partition (e.g., first partition 110) to a destination partition (e.g., second partition 116). In some embodiments, a proxy mechanism may be employed in addition to or instead of load balancing/domain name service 104. The proxy mechanism may comprise an intermediary for communicating with first partition 110, second partition, 116, and third partition 118. A client may issue requests to read or write data to the proxy, which may in turn forward the request to the appropriate partition. Data may then be returned from the partition to the client via the proxy.

A load balancing/domain name service 104 may participate in processing read requests 100 by directing read requests 100 to a partition selected from a set of partitions designated as candidates for assisting in load balancing by processing requests to read data. In various embodiments, this could include all or some partitions not designated as master. In other various embodiments, a master partition may also be included in a set of partitions designated as candidates for load balancing.

Load balancing may comprise application of various techniques and mechanisms for distributing workload among a plurality of partitions, which could include distributing workload between a master partition and one or more non-master partitions, or only between non-master partitions.

In the system depicted in FIG. 1, partitions not currently selected as a master partition may be described as read-only because write requests 100 are not directed to them. However, the term read-only is not intended to suggest that data on these partitions may not be modified. For example, second partition 116 and third partition 118 may process write requests received through replication 112 or 114.

A partition, such as second partition 116, may be selected for performing a maintenance operation. A maintenance operation could include various operations that may be performed on a partition, such as those designed to maintain stability and efficiency of a partition. Various non-limiting examples of maintenance operations include pruning, calculating statistics, defragmenting and re-indexing. In general terms, a maintenance operation may be described as an operation that has a potential to interface with the normal operation of a partition, if performed while the partition is in a normal operating state. For example, if a maintenance operation were to be performed on a second partition 116 while it was in a normal operating state—for example when continuing to process read requests 100—the efficiency of that processing might be affected.

Figure 2:
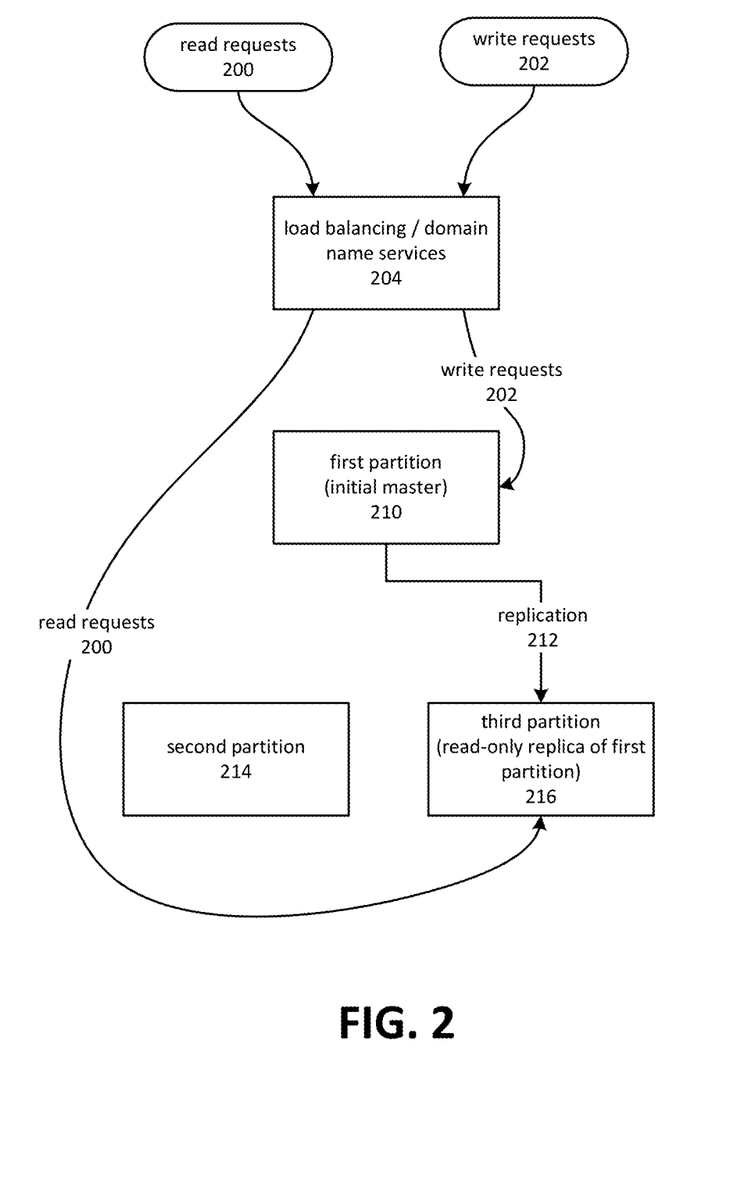
FIG. 2 is a block diagram depicting an example of an embodiment of a distributed database system in an interim state during performance of maintenance operations on a partition using rotation of partitions.

FIG. 2 is a block diagram depicting an example of an embodiment of a distributed database system in an interim state during performance of maintenance operations on a partition using rotation of partitions. In the example of FIG. 2, first partition 210 continues to process write requests 200 forwarded to it by or at the behest of load balancing/domain name services 204. First partition 210 may continue to be involved in replication 212 with third partition 216. Read requests 200 may be processed by third partition 216, due to third partition 216 remaining in a set of partitions designated as load balancing candidates and selected by load balancing/domain name services 204 for processing one or more of read requests 200.

Second partition 214, however, may be removed from the set of partitions designated as candidates for load balancing read requests 200. In addition, a previous replication relationship (not pictured) between first partition 210 and second partition 214 may have been suspended or terminated. Removal from the set of load balancing candidates and from the replication relationship may permit second partition 214 to perform one or more maintenance operations.

Note that the rotational mechanism presented herein may permit performance of maintenance operations on partitions of a distributed database system while keeping overall performance of the system above (that is to say, as good as) a predefined level. For example, in a distributed database system comprising five read-only partitions, a desired predefined level of performance could be set at 80% of the performance achievable through the use of all five partitions simultaneously. The goal, 80% of that level, could be sustained even when one of the five partitions is removed for performing maintenance operations.

In some cases and embodiments, there may be pending replication operations to be performed on second partition 214 at the time the replication relationship between the first partition and the second partition is suspended or terminated. Pending replication operations may also accumulate while maintenance operations are being performed, and held in a buffer for subsequent processing by the second partition. A switchover point may be defined for a time at which the second partition 214 may be designated a new master, such that it, rather than first partition 210, will receive and process write requests 202. Replication requests prior to the switchover point may be processed by second partition 214 prior to write requests received after the switchover point being processed directly (rather than through replication) by second partition 214. Embodiments may buffer write requests 202 received after the switchover point while processing pending replication messages.

Embodiments may employ various mechanisms to buffer incoming requests to write data. In some embodiments, the second partition may perform buffering of writes directed to it after the switchover point. Other embodiments may utilize an external system, such as a control plane, load balancing system, and so forth.

Figure 3:
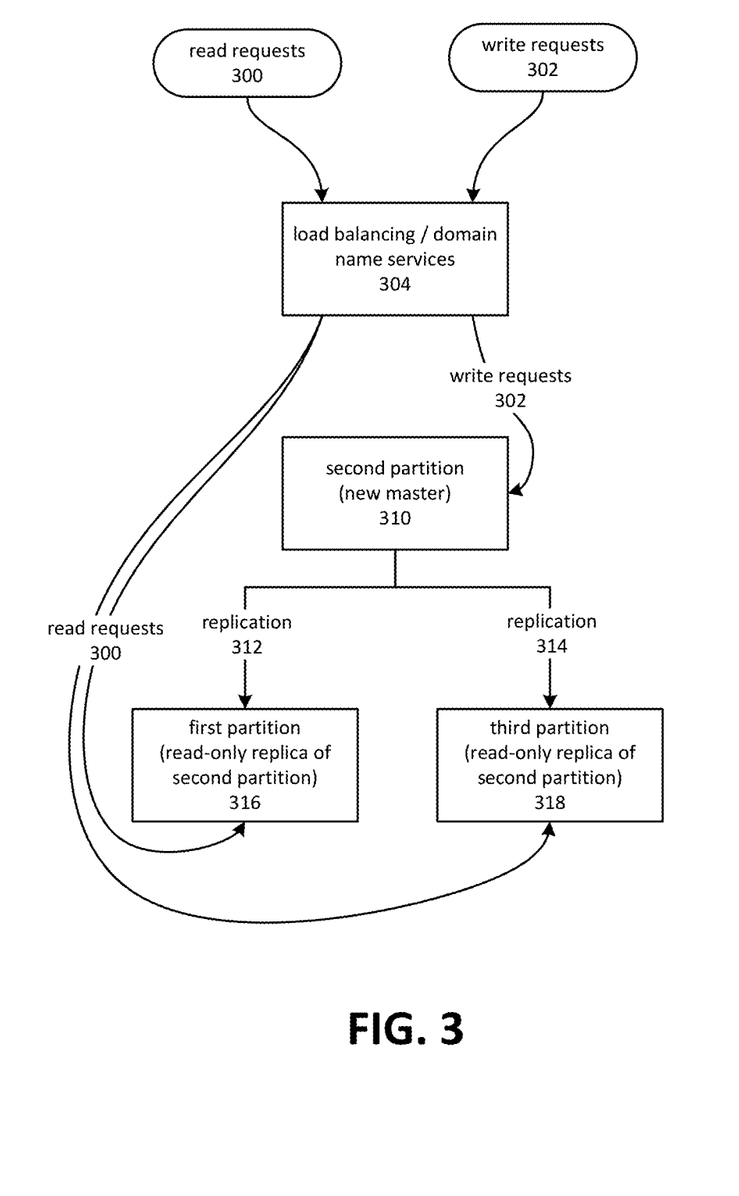
FIG. 3 is a block diagram depicting an example of an embodiment of a distributed database system having completed a rotation of partitions.

FIG. 3 is a block diagram depicting an example of an embodiment of a distributed database system having completed a rotation of partitions. In FIG. 3, second partition 310 has been selected as the new master. As a result, the depicted system will operate by routing write requests 302, by load balancing/domain name services 304, to second partition 310. Read requests may be routed to partitions identified as candidates for load balancing, which in FIG. 3 are depicted as first partition 316 and third partition 318.

Embodiments may further operate second partition 310 as a new master by causing the performance of replication 312 and replication 314. Data may be replicated from second partition 310 to first partition 316, and from second partition 310 to third partition 318. Second partition 310 therefore becomes a leading partition in processing write requests 302, and first partition 316 and third partition 318 become eventual replicas of second partition 310.

Figure 4:
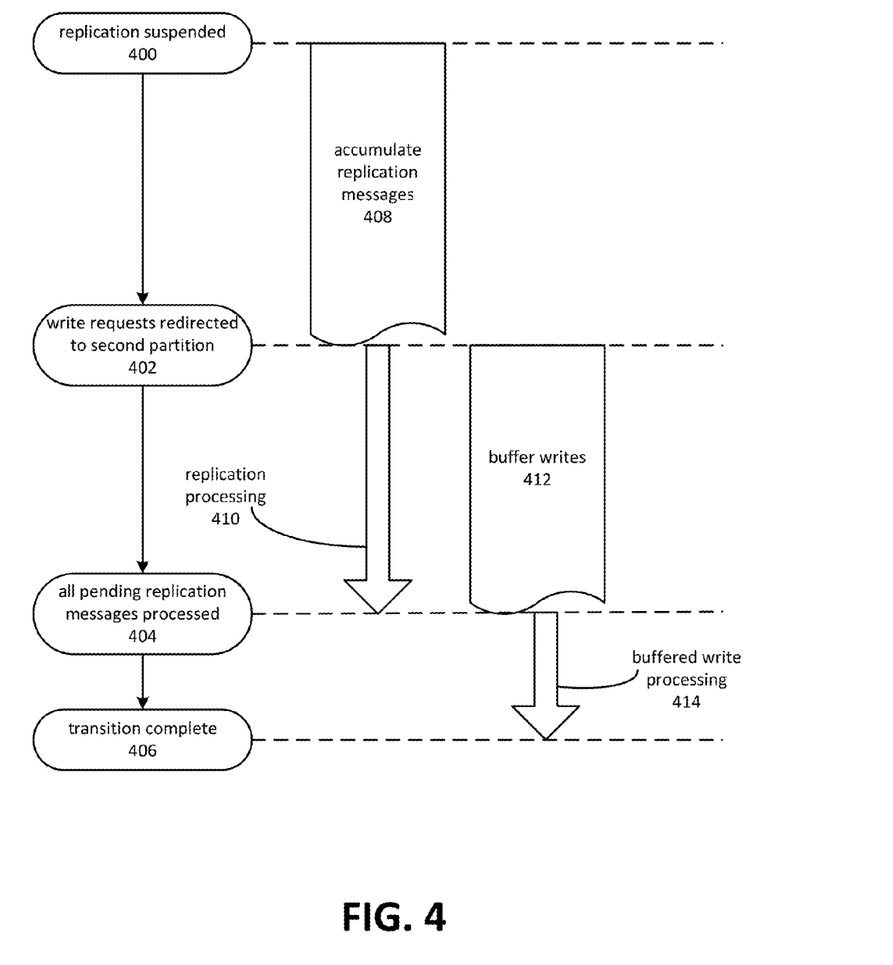
FIG. 4 is a block diagram depicting a process for transitioning a master partition role from a first partition to a second partition.

FIG. 4 is a block diagram depicting a process for transitioning a master partition role from a first partition to a second partition. FIG. 4 depicts a sequence of events 400-406. Although depicted as a sequence of events, various cases and embodiments of transitioning a master partition role may comprise additional events, fewer events, or events in a different sequence than is depicted in FIG. 4. Events may also occur in parallel. The sequence of events 400-406 is intended to be illustrative of various aspects of transitioning a master role of a first partition to a second partition, and therefore should not be seen as limiting the scope of the present disclosure. Similarly, FIG. 4 depicts operation 408-414 which, although depicted in sequence, may be altered, reordered, omitted, or performed in parallel. The depicted sequence of operations 408-414 should therefore not be seen as limiting the scope of the present disclosure. In addition, the terms "event" and "operation" are used to illustrate coordination between various circumstances, actions, steps, and occurrences that may occur during transitioning of the second partition to a master role. The use of the terms "event" and "operation" should not be viewed as limiting the scope of the present disclosure.

Event 400 ("replication suspended") depicts the suspension of replication between the first partition, which as noted is initially the designated master partition. Suspension of replication may indicate that the second partition is to temporarily stop processing replication messages (or other information, such as log entries) that, when processed by the second partition, would bring the second partition into the same state as the first partition. Operation 408 ("accumulate replication messages") indicates that this information may accumulate until at least event 402 ("write requests redirected to second partition"), or until processing of these messages otherwise resumes or becomes unnecessary.

Event 402 ("write requests redirected to second partition") may be described as a switchover point at which the second partition effectively becomes the new master, although the process is not yet fully complete as of completion event 402. At this time, because write requests are being redirected to the second partition, replication messages originating from the first partition may no longer accumulate.

In response to event 402 ("write requests redirected to second partition"), some embodiments may begin operation 410 ("replication processing") to bring the second partition up-to-date with respect to the first partition, by processing the data accumulated during operation 408 ("accumulate replication messages"). In other embodiments, operation 410 ("replication processing") may begin in response to the maintenance operation being complete. In such embodiments, it may be the case that event 402 ("write requests redirected to second partition") occurs before operation 410 ("replication processing") completes.

Operation 412 ("buffer writes") depicts embodiments buffering write requests that are directed to the second partition subsequent to event 402. Write requests may be stored prior to processing by the second partition. In some embodiments, operation 414 ("buffered write processing") may occur in response to event 404 ("all pending replication messages processed"). Embodiments may complete all pending replication messages prior to processing write requests in order to apply updates in an appropriate order. Some embodiments may, however, be able to perform operation 410 ("replication processing") and operation 414 ("buffered write processing") using various amounts of parallelization.

At the completion of operation 414 ("buffered write processing"), the second partition may be in a state in which event 406 ("transition complete") may be said to have occurred. In this state, any unprocessed replication messages may have been processed, any buffered write requests have been processed, and the second partition may begin operation as a master partition. Note that event 406 ("transition complete") may be associated with other events and operations not depicted in FIG. 4. These include establishment of replication from the second partition to the first partition (the initial master), and from the second partition to any additional partitions.

Figure 5A:
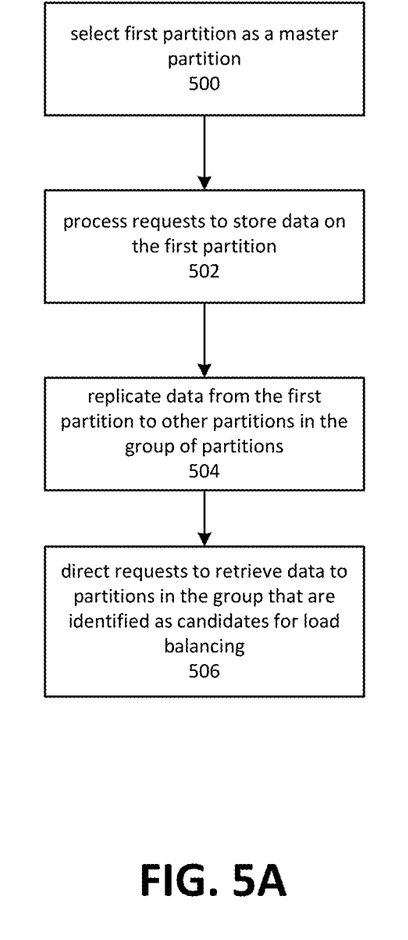
FIG. 5A depicts an embodiment of a process for operating a group of partitions in which one partition acts as a master partition and additional partitions act as read-only replicas of the first partition.

FIG. 5A depicts an embodiment of a process for operating a group of partitions in which one partition acts as a master partition and additional partitions act as read-only replicas of the first partition. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of hardware, circuitry, and computer-executable instructions executed by a computing system, such as the computing systems described herein.

In some embodiments, a control plane or other computing node may perform functions related to the management of partitions, such as designating a master partition, selecting partitions which should undergo maintenance operations, and so forth. These functions are described in greater detail below, in connection with FIGS. 5A and 5B.

A first partition may, as depicted by operation 500, be selected as a master partition. Initial selection of a partition may, in some cases, be performed by an initial configuration. An initial partition may be selected arbitrarily or based on various criteria, such as performance, operating health and so forth. Selecting a partition may refer generally to designation of a partition through various means consistent with the present disclosure. After an initial selection of a partition, subsequent selection or designation of a partition may be performed on a rotational basis consistent with various aspects and embodiments described herein.

Operating the first partition as a master may involve processing requests to store data on the first partition. This is depicted in FIG. 5 by operation 502. In various cases and embodiments, the partition designated as a master partition will, while acting as a master partition, process all requests to store data that are directed to a group of partitions comprising the first partition and one or more additional partitions. The additional partitions may process read requests but not write requests.

Operation 504 involves replicating data from the first partition to other partitions in the group of partitions. Replication relationships may be formed from the first partition to each of the other partitions in the group of additional partitions. In this manner, write requests are processed initially by the first partition and propagated via replication to the additional partitions.

Operation 506 involves directing requests to retrieve data to partitions in the group that are identified as candidates for load balancing. Embodiments may maintain a mechanism for tracking partitions available for processing a share of the workload involved in processing read requests. In various embodiments, a domain-name service, router, switch, or other mechanism may be used to direct read requests to available partitions. Read requests may, for example, be directed on a round-robin basis to partitions identified as candidates for load balancing.

Figure 5B:
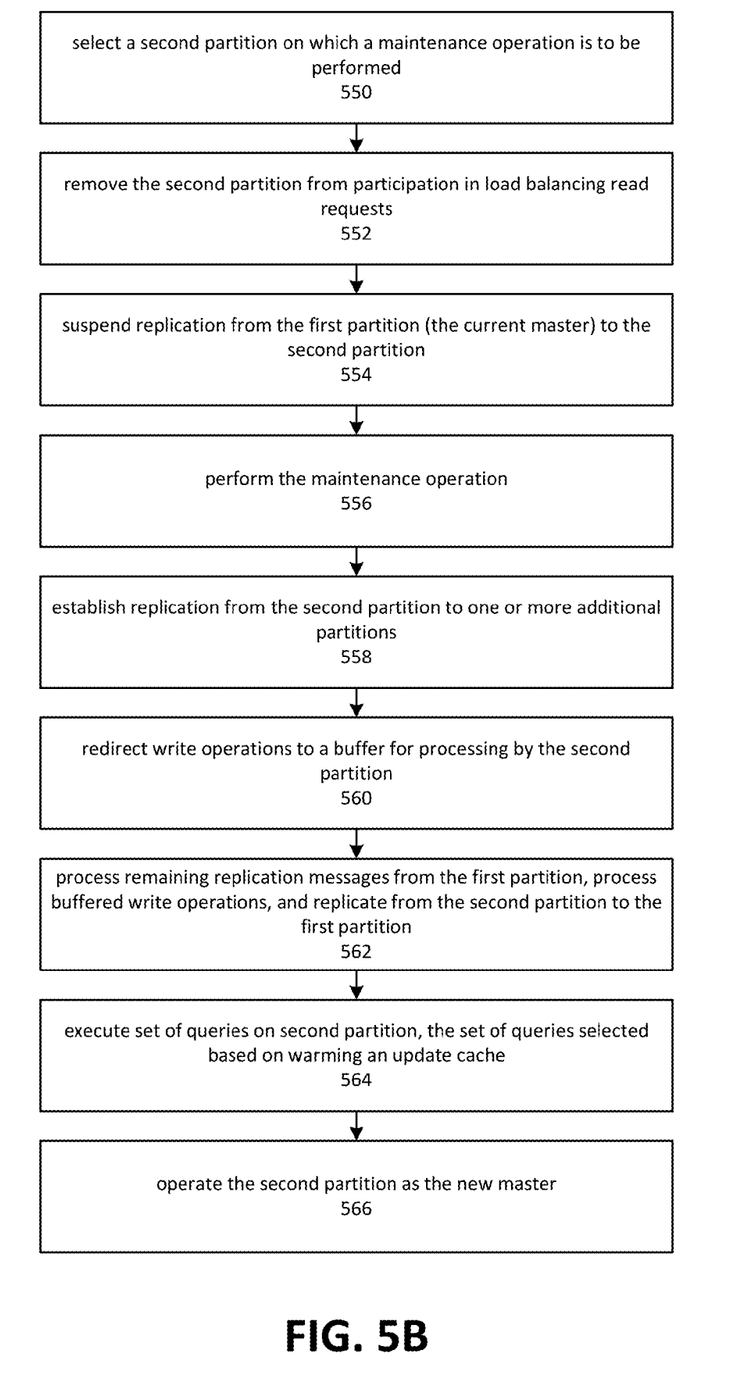
FIG. 5B depicts a process for performing database maintenance on a non-master partition in a group of partitions and rotating that partition to the role of master.

FIG. 5B depicts a process for performing database maintenance on a non-master partition in a group of partitions and rotating that partition to the role of master. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of hardware, circuitry, and computer-executable instructions executed by a computing system, such as the computing systems described herein.

Operation 550 involves selecting a second partition on which a maintenance operation is to be performed. Embodiments may utilize various approaches for designating a second partition. In some embodiments, a round-robin selection technique may be employed. In other embodiments, a partition may be selected at random. Embodiments may also employ various metrics in determining which partition to select. For example, an embodiment might employ metrics such as the size of the partition, the age of data contained in the partition, various performance metrics, and so on. Embodiments might also consider the time that has elapsed since the last maintenance operation was performed on a partition. In some cases and embodiments, a partition may be selected for maintenance based on a request that maintenance be performed on that partition, or in response to a general request involving one or more of the partitions in the system.

In an embodiment, maintenance procedures may be initiated based on parameters supplied by a customer of a hosted service. For example, a web page or web service application programming interface ("API") may be configured to receive information from a customer-operated process that pertains to scheduling maintenance operations. The information may comprise the types of operations to be performed, such as pruning, index creation, and so on. The information may also indicate the frequency with which such operations should be performed, metrics for determining when to perform the operations, and so on.

Web pages, APIs, or other interface mechanisms may also be used to trigger maintenance operations directly. An embodiment might, for example, be configured to receive information from a customer-operated process to perform a selected maintenance operation on a particular computing node. Embodiments may provide this capability in conjunction with health and status information. For example, a web page or web service might provide health and status information to the customer or to a customer-operated process. The information might indicate various performance metrics for the various computing nodes that comprise a database system operated on behalf of the customer. The information may enable the customer or customer-operated process to invoke an API or otherwise indicate that a particular computing node, or set of computing nodes, should undergo maintenance using the techniques described herein.

Embodiments may select a number of partitions, in addition to the second partition, to undergo maintenance operations at the same time. The number of partitions selected for simultaneously undergoing maintenance may be determined based on a minimum performance level for the group of partitions. The operations depicted in FIGS. 5A and 5B with reference to a second partition may be applicable to the additional partitions, except those operations related to rotating the second partition into the role of master.

At operation 552, embodiments may, in response to the selection, remove the second partition from participation in load balancing requests. This could, for example, comprise removing a network address of the second partition from a list of entries in a domain name service, switch, or router.

At operation 553, replication from the first partition (the current master) to the second partition may be suspended. There may, in various cases and embodiments, be replication messages or operations that have yet to be performed on the second partition. These may be held in abeyance while the maintenance operation is performed and completed prior to transitioning the second partition to the master role.

Operation 556 involves performing the maintenance operation. Any number of related or unrelated maintenance procedures, or other procedures, may be performed. Examples include pruning, re-indexing, defragmentation, and so on.

As depicted by operation 558, replication relationships may be established from the second partition to other partitions in the group. The partitions for which replication relationships are to be established may include the first partition (the current master). Embodiments may establish replication relationships in two stages. First, replication relationships from the second partition to partitions other than the first may be established. Second, a replication relationship from the second partition to the first partition may be established. This second stage may occur, for example, during the later stages of the transition of the second partition to a master role.

At operation 560, embodiments may redirect write operations directed to the first partition to a buffer, for subsequent processing by the second partition. Operation 562 involves processing remaining replication messages from the first partition, and then processing buffered write operations. Embodiments may, in response to completing the buffered write operations, establish replication from the second first partition to the first partition.

Operation 564 depicts performing a set of queries on the second partition in order to warm up the second partition's update cache prior to its assumption of the role of master. Embodiments may perform this operation at various stages, including prior to the portion of operation 562 that pertains to processing buffered write operations. The set of queries that is performed may be selected based on the relevance of the queries to data that is likely to be updated. Execution of the queries may, in some embodiments, be used to pre-load an update cache and thereby affecting the efficiency of processing subsequent update operations.

At operation 566, embodiments may operate the second partition as the new master. The first partition may operate as a replica of the second partition and may join the set of partitions that participate in load balancing read requests.

Some embodiments may cause certain cache-warming operations to be performed on the second partition prior to completion of the transition to its role as the new master partition. Embodiments may cause the second partition to perform data retrieval operations that have the effect of pre-loading an update cache of the second partition. Similar techniques may be employed on the previous master partition to have the effect of pre-loading caches used in processing read requests.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives. As used herein, storing data may refer to performing any of various types of operations that involve writing data, such as adding, inserting, changing, and deleting data. The terms "update" and "updating" data may also be viewed as being synonymous with storing data.

Figure 6:
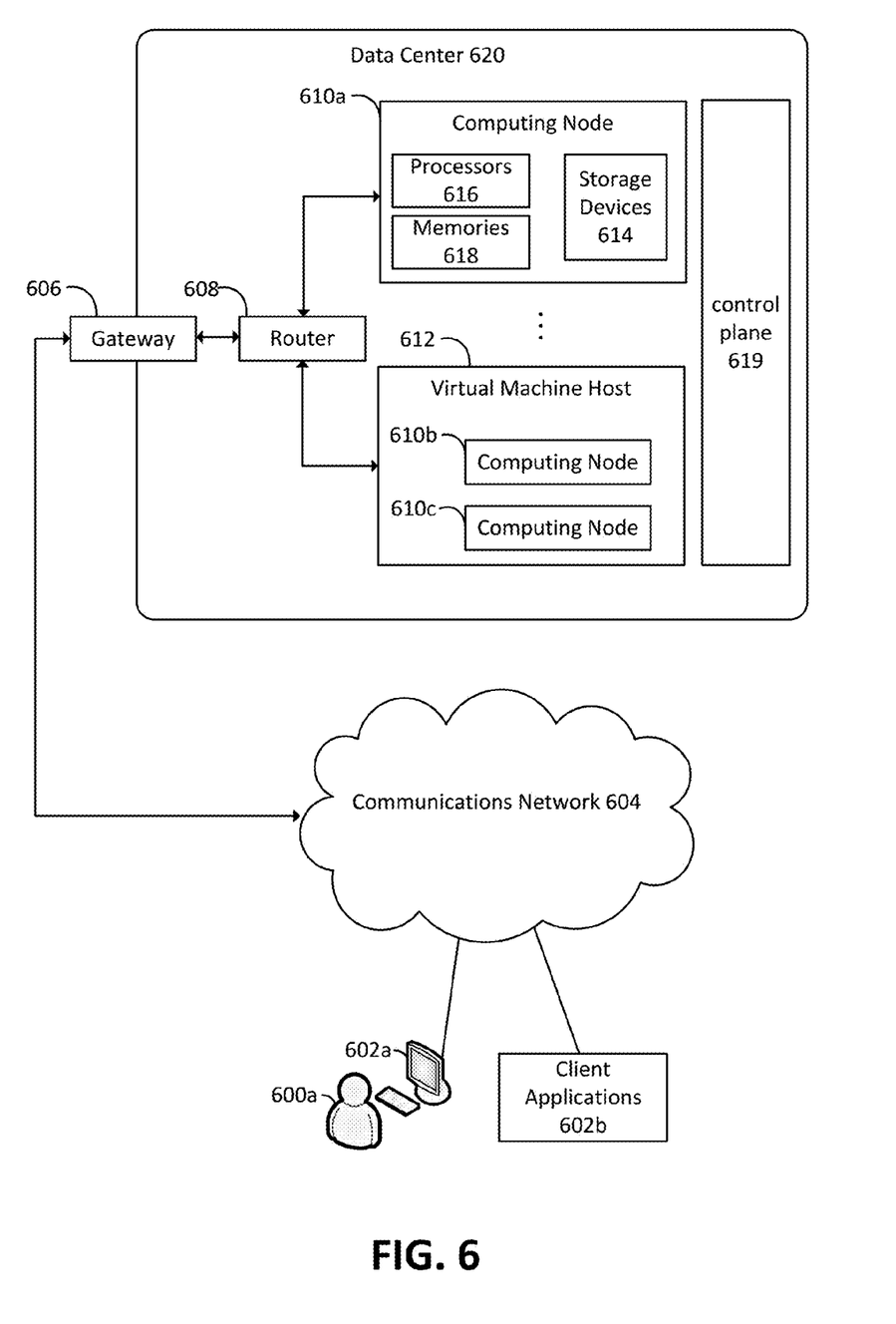
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618, and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory, and storage devices. Any number of virtualization mechanisms might be employed to host the computing nodes.

A control plane 619 may comprise a computing node configured to coordinate or manage operations of other computing resources in data center 620, such as computing nodes 610a, 610b, and 610c, as well as virtual machine host 612. A control plane 619 may also manage aspects of the configuration and operation of gateway 606 and router 608, as well as various other network components not explicitly depicted in FIG. 6. Embodiments may include an management interface in control plane 619 for managing control functions such as creating new instances of a computing node such as computing nodes 610a, 610b, or 610c, adding or configuring a virtual machine host 612, configuring network configuration of router 608, and so on. Embodiments of a control plane 619 may also comprise mechanisms for configuring services or controlling operation of services within data center 620.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
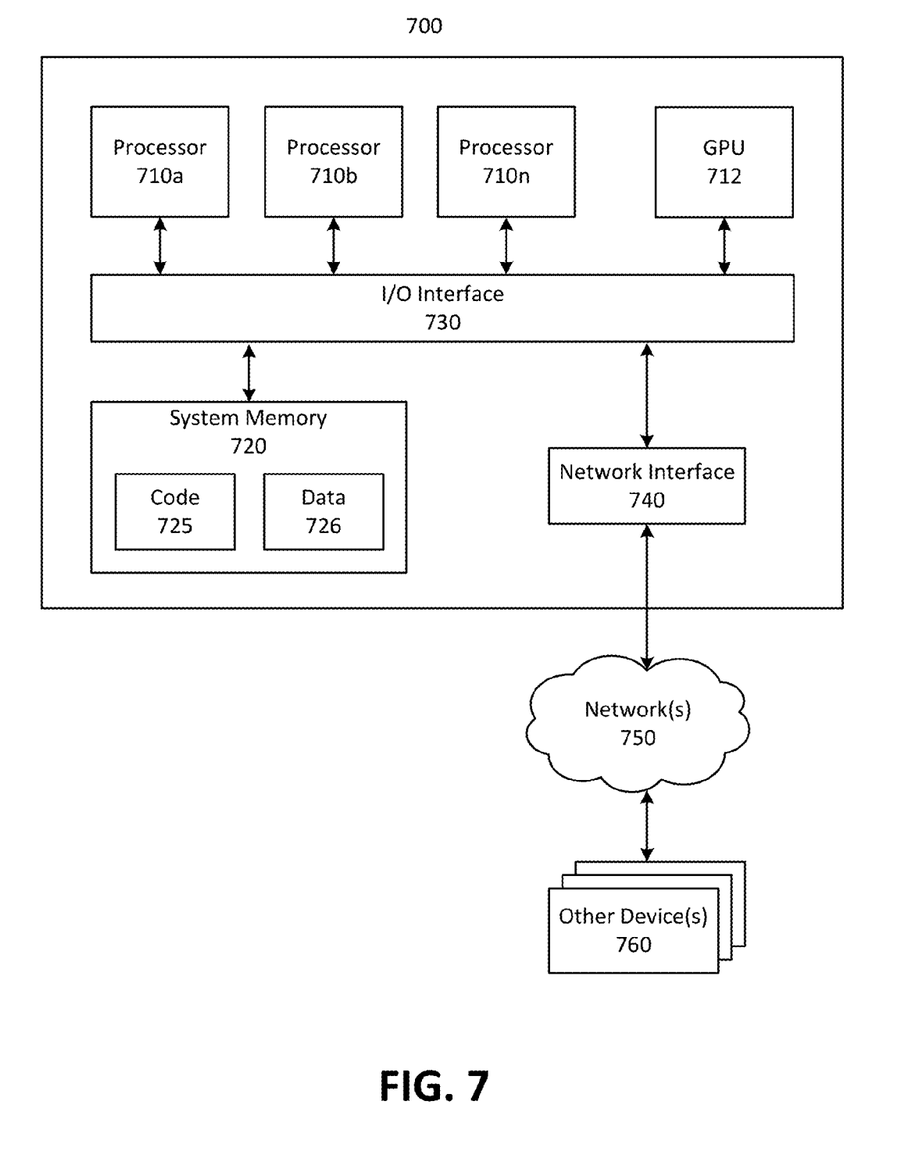
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 610). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more computing nodes communicatively coupled to one or more storage devices, the one or more computing nodes configured as a database management system that maintains a plurality of partitions stored on the one or more storage devices, the plurality of partitions comprising at least a first partition and a second partition;
   one or more memories having stored thereon computer readable instructions that, upon execution by the one or more computing nodes, cause the system at least to:
      operate the first partition as a master partition, wherein operating the first partition as the master partition comprises causing a first plurality of requests to store data to be processed on the first partition and comprises causing data to be replicated from the first partition to the second partition;
      select the second partition for processing a first plurality of requests to retrieve data, wherein the second partition is selected based at least in part on being part of a set of partitions, of the plurality of partitions, identified as candidates for processing requests to retrieve data;
      determine that a maintenance operation should be performed on the second partition, and in response to the determination, remove the second partition from the set of partitions identified as candidates for processing requests to retrieve data and cause replication between the first partition and the second partition to be suspended;
      cause the maintenance operation to be performed on the second partition; and
      operate the second partition as the master partition instead of the first partition, wherein operating the second partition as the master partition comprises causing a second plurality of requests to store data to be processed on the second partition and comprises causing data to be replicated from the second partition to the first partition, the second plurality of requests to store data received subsequent to the first plurality of requests to store data.

2. The system of claim 1, further comprising one or more memories having stored thereon computer readable instructions that, upon execution by the one or more computing nodes, cause the system at least to:
   determine, subsequent to the second partition operating as the master partition, that a maintenance operation should be performed on the first partition.

3. The system of claim 1, further comprising one or more memories having stored thereon computer readable instructions that, upon execution by the one or more computing nodes, cause the system at least to:
   buffer the requests to store data in response to causing the requests to store data to be processed on the second partition;

complete suspended replication of data from the first partition to the second partition; and process the buffered requests to store data.

4. The system of claim 1, wherein the maintenance operation comprises at least one of pruning, calculating statistics, defragmenting, executing data definition language statements, generating reports and re-indexing.

5. A method comprising:

operating a database management system comprising a plurality of partitions including a first partition and a second partition;

causing, by one or more computing devices, the first partition to operate as a master partition, wherein operating the first partition as the master partition comprises processing requests to store data on the first partition and replicating data to the second partition;

causing, by the one or more computing devices, the requests to retrieve data to be processed by the second partition;

selecting the second partition for performing a maintenance operation, and in response to the selecting, removing the second partition from a set comprising a plurality of partitions that may be selected for processing requests to retrieve data, and causing replication between the first partition and the second partition to be suspended;

causing the maintenance operation to be performed on the second partition; and causing, by the one or more computing devices, the second partition to operate as the master partition instead of the first partition, wherein operating the second partition as the master partition comprises processing requests to store data on the second partition and replicating data to the first partition.

6. The method of claim 5, further comprising:

replicating data between the first partition and an additional partition of the plurality of partitions; and in response to completing the maintenance operation on the second partition, stopping replication from the first partition to the additional partition, and starting replication from the second partition to the additional partition.

7. The method of claim 5, wherein the maintenance operation comprises at least one of pruning, calculating statistics, defragmenting, executing data definition language statements, generating reports, and re-indexing.

8. The method of claim 5, further comprising:

causing the second partition to perform one or more data retrieval operations prior to selecting the second partition as the master partition, wherein the one or more data retrieval operations are based at least in part on pre-loading an update cache of the second partition.

9. The method of claim 5, wherein selecting the second partition as the master partition comprises redirecting, to the second partition, requests to store data that are queued for processing on the first partition.

10. The method of claim 9, further comprising:

storing the redirected requests to store data in a buffer;

completing pending replication of data from the first partition to the second partition; and processing the redirected requests to store data based at least in part on retrieving the redirected requests from the buffer.

11. The method of claim 5, further comprising:

redirecting requests to store data on the first partition by at least replacing a network address of a domain name service entry of the master partition with a network address of the second partition.

12. The method of claim 5, further comprising:

adding, in response to causing the second partition to operate as the master partition, the first partition to the set of partitions that may be selected for processing requests to retrieve data.

13. The method of claim 5, wherein selecting the second partition for performing a maintenance operation is based at least in part on receiving a request to perform the maintenance operation.

14. A non-transitory computer-readable storage medium having stored thereon instructions that, upon execution by one or more computing devices, cause the one or more computing devices at least to:

operate a database management system comprising a plurality of partitions including a first partition and a second partition;

select the first partition as a master partition, wherein selecting the first partition as the master partition comprises causing requests to store data to be processed by the first partition and causing data to be replicated from the first partition to the second partition;

cause requests to retrieve data to be processed by the second partition;

select the second partition for performing a maintenance operation, and in response to the selection, remove the second partition from a set comprising a plurality of partitions that may be selected for processing requests to retrieve data, and stopping replication between the first partition and the second partition;

cause the maintenance operation to be performed on the second partition; and select the second partition as the master partition, wherein selecting the second partition as the master partition comprises causing requests to store data to be processed by the second partition and causing data to be replicated from the second partition to the first partition.

15. The non-transitory computer-readable storage medium of claim 14, comprising further instructions that, upon execution by the one or more computing devices, cause the one or more computing devices to at least:

replicate data between the first partition and an additional partition of the plurality of partitions; and in response to completing the maintenance operation, stop replicating from the first partition to the additional partition, and start replicating from the second partition to the additional partition.

16. The non-transitory computer-readable storage medium of claim 14, wherein selecting the second partition for performing a maintenance is based at least in part on one or more of round-robin selection, randomized selection, in response to a request for maintenance, or selection based on a metric.

17. The non-transitory computer-readable storage medium of claim 14, comprising further instructions that, upon execution by the one or more computing devices, cause the one or more computing devices to at least:

process one or more requests to store data that are queued for processing by the first partition; and replicate data corresponding to the one or more requests to the second partition prior to operating the second partition as the master partition.

18. The non-transitory computer-readable storage medium of claim 14, wherein selecting the second partition as the master partition comprises redirecting requests to store data on the first partition to the second partition.

19. The non-transitory computer-readable storage medium of claim 14, comprising further instructions that, upon execution by the one or more computing devices, cause the one or more computing devices to at least:
  buffer the requests to store data;
  complete pending replication of data from the first partition to the second partition; and
  process the buffered requests to store data.

20. The non-transitory computer-readable storage medium of claim 14, comprising further instructions that, upon execution by the one or more computing devices, cause the one or more computing devices to at least:
  redirect requests to store data on the first partition by at least replacing a network address of a domain name service entry of the master partition with a network address of the second partition.

21. The non-transitory computer-readable storage medium of claim 14, comprising further instructions that, upon execution by the one or more computing devices, cause the one or more computing devices to at least:
  add the first partition to the set of partitions that may be selected for processing requests to retrieve data.

* * * * *